United States Patent [19]
Heymes et al.

[11] Patent Number: 6,077,363
[45] Date of Patent: *Jun. 20, 2000

[54] AL-CU-MG SHEET METALS WITH LOW LEVELS OF RESIDUAL STRESS

[75] Inventors: Fabrice Heymes, Saint-Marcelliln; Philippe Lequeu; Guy-Michel Raynaud, both of Issoire, all of France

[73] Assignee: Pechiney Rhenalu, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/663,017

[22] Filed: Jun. 17, 1996

[51] Int. Cl.$^7$ ................................................ C22C 21/00

[52] U.S. Cl. ..................... 148/417; 420/533; 420/534; 420/537; 420/553; 148/417; 148/439; 428/654

[58] Field of Search ..................................... 420/533, 534, 420/537, 538, 553; 148/417, 439; 428/654

[56] References Cited

U.S. PATENT DOCUMENTS

| | | |
|---|---|---|
| 2,296,866 | 9/1942 | Moss . |
| 3,826,688 | 7/1974 | Leuy ........................................ 148/417 |

FOREIGN PATENT DOCUMENTS

| | | |
|---|---|---|
| 473122 | 3/1992 | European Pat. Off. . |
| 959650 | 3/1950 | France . |
| 58-8189353 | of 0000 | Japan . |
| 572210 | 9/1945 | United Kingdom . |

OTHER PUBLICATIONS

Translation of JP (97–2997).

*Primary Examiner*—Patrick Ryan
*Assistant Examiner*—M. Alexandra Elve
*Attorney, Agent, or Firm*—Dennison, Meserole, Pollack & Scheiner

[57] ABSTRACT

A metal sheet with a total thickness >0.5 mm comprising an AlCuMg aluminum alloy consisting essentially of Al and, in percent by weight:

| |
|---|
| 3.5 < Cu < 5.0 |
| 1.0 < Mg < 2.0 |
| Si < 0.25 |
| Fe < 0.25 |
| Mn < 0.55 | all other elements: <0.25
with 0<Mn−2Fe<0.2, optionally plated with another aluminum alloy with the thickness of the plating being no more than 12% of the total thickness of the sheet, the sheet having a recrystallization rate >50% at all points and a deviation in recrystallization rate between surface and mid-thickness <35%, the sheet having in the quenched and stretched state or in the quenched, stretched and annealed state, a deflection after machining to mid-thickness of a bar resting on two distant supports with a length l such that:

$$fe < 0.14 l^2,$$

where f is the deflection expressed in micrometers, e being the thickness of the sheet in mm and l is the length of the bar in mm.

36 Claims, 12 Drawing Sheets

AL-CU-MG SHEET METALS WITH LOW LEVELS OF RESIDUAL STRESS

FIELD OF THE INVENTION

The invention relates to heavy (>12 mm thick), average (between 3 and 12 mm thick), or light (between 0.5 and 3 mm thick) sheet metals made from a high-strength Al—Cu—Mg aluminum alloy belonging to the 2000 series, in accordance with the designations of the Aluminum Association of the United States, which after quenching have a low level of residual stress, while retaining high static mechanical properties (tensile strength, yield strength and elongation), excellent damage tolerance, a low crack propagation rate and good fatigue resistance, all of which properties are particularly well adapted to their use in aircraft construction. These sheets can be used uncoated or plated with another aluminum alloy having, for example, better corrosion resistance.

DESCRIPTION OF RELATED ART

The residual stress present in age hardened aluminum sheets results from the quenching which must be carried out in order to provide them with good mechanical properties. The thermal shock caused by the rapid cooling from high temperatures required for the natural aging of the alloying elements produces extremely high internal stress.

This stress is troublesome because it causes substantial strain when the sheets are machined, which is frequently the case in aircraft construction. In order to reduce this stress, various processes for relieving stress are used after quenching, for example a controlled stretching or compression which makes it possible to reduce the internal stress without affecting the properties of the product like a heat treatment would. The research in this area has essentially consisted of optimizing the stretching or compression operations required to ensure effective stress relief.

In addition, much work has been done on the quenching operation itself. This operation is generally carried out by means of immersion in or spraying with cold water, and the cooling speeds obtained in this way are often unnecessarily high. In effect, each alloy has a critical quenching rate; if the cooling occurs more slowly than this critical rate, it causes a decomposition of the solid solution which results in a substantial reduction in the ultimate mechanical properties as well as the damage tolerance. It must therefore be quenched faster than this critical rate, but it is useless to go much beyond it, since it is known that the more intense the cooling, the higher the internal stress.

Thus, a compromise must be found in order to optimize the quenching of the sheets with a cooling which prevents any reduction in the ultimate mechanical properties and minimizes the internal stress.

SUMMARY OF THE INVENTION

The object of the invention is to obtain, in sheet metals made from age hardening alloys of the Al—Cu—Mg type, a reduced level of residual stress after quenching, while maintaining static mechanical properties (tensile strength, yield strength and elongation) and a fatigue resistance which are as high as those in the current alloys, and while improving, in heavy sheets, the toughness in the various directions and the crack velocity in the long-transverse (L-T) and transverse-long (T-L) directions, without changing anything in the procedures currently used for quenching and relieving stress.

The subject of the invention is a sheet metal with a thickness of >0.5 mm made from an aluminum alloy with the following composition (% by weight):

| |
|---|
| 3.5 < Cu < 5.0 |
| 1.0 < Mg < 2.0 |
| Si < 0.25 |
| Fe < 0.25 |
| Mn < 0.55 | all other elements <0.25
with 0<Mn−2Fe <0.2
possibly plated on 1 or 2 sides with another aluminum alloy having a total thickness which does not exceed 12% of the total thickness of the plated sheet, which sheet has a recrystallization rate >50% at all points and a deviation between the recrystallization rate at the surface and that at mid-thickness <35%, and has in the quenched and stretched state, or the quenched, stretched and annealed state, a deflection f after a machining to half-thickness of a bar resting on two distant supports with a length l, such that:

$$fe < 0.14 l^2$$

preferably:

$$fe < 0.09 l^2$$

and even more preferably:

$$fe < 0.06 l^2$$

with f being measured in micrometers, e being the thickness of the sheet in mm and l also being measured in mm.

For light sheets with a thickness of <3 mm, the deflection is such that:

$$fe < 0.04 l^2$$

Preferably, the iron content is less than 0.2%, the silicon content less than 0.17% or even 0.10%, the copper content less than 4%, the magnesium content less than 1.5%, and the manganese content less than 0.4%.

The sheets have a yield strength $R_{0.2}$ in the transverse-long direction greater than 290 MPa in the quenched state, and greater than 400 MPa in the annealed state. As for plated sheets such as, for example, those used in the manufacture of aircraft fuselages, they are generally plated on two sides with an aluminum alloy which is not very loaded and has good corrosion resistance, and each layer of plating can represent between 4 and 6% of the total thickness in the lightest sheets, and up to 2 to 4% of the total thickness of sheets >1.6 mm thick, which means that the total thickness of the plating never exceeds 12% of this total thickness. For these plated sheets, the yield strength in the L-T and T-L directions is greater than 270 and 380 MPa, respectively.

The sheets have a fatigue resistance, measured on flat test bars with a stress concentration factor $K_t=2.3$ with a ratio R between the minimum and the maximum stress of 0.1, such that the stress acceptable for a given number of cycles is greater than:

295 MPa for $10^4$ cycles
160 MPa for $10^5$ cycles
100 MPA for $10^6$ cycles
100 MPa for $10^7$ cycles The heavy sheets >20 mm thick, made of an alloy with less than 0.2% Fe have a toughness in the quenched and stretched state, measured by the critical stress intensity factor under plane strain $K_{1c}$, in the L-T and T-L directions which is respectively greater than 35 and 32 MPa$\sqrt{m}$, and preferably greater than 40 and 35 MPa$\sqrt{m}$.

In the quenched, stretched and annealed state, this toughness is respectively greater than 28 and 25 MPa$\sqrt{m}$, and preferably greater than 32 and 28 MPa$\sqrt{m}$.

The toughness measured in the S-L direction for sheets >35 mm thick is greater than 22 and preferably 24 MPa$\sqrt{m}$ in the quenched, stretched state, and greater than 18 and preferably 20 MPa$\sqrt{m}$ in the quenched, stretched and annealed state. The heavy sheets also have, in the L-T and T-L directions, a crack velocity da/dn, for a loading with R=0.1, which is less than:

$$5 \times 10^{-5} \text{mm/cycle for } \Delta K = 10 \ MPa\sqrt{m}$$
$$10^{-4} \text{mm/cycle for } \Delta K = 15 \ MPa\sqrt{m}$$
$$6 \times 10^{-4} \text{mm/cycle for } \Delta K = 20 \ MPa\sqrt{m}$$
$$2 \times 10^{-3} \text{mm/cycle for } \Delta K = 25 \ MPa\sqrt{m}$$

The orientation code for the L-T, T-L and S-L directions is defined in the ASTM E 399 standard related tests for the toughness of metallic materials.

The sheets with a thickness of less than 20 mm have a toughness measured by the critical stress intensity factor under plane strain $K_{cb}$, in the T-L direction, greater than 110 MPa$\sqrt{m}$. It is measured on a test bar with a width of 405 mm, a notch length of 100 mm and a thickness equal to that of the sheet up to 6 mm and a thickness of 6 mm beyond that, which thickness is obtained after symmetrical surfacing.

DESCRIPTION OF THE INVENTION

In contrast with the research trends of the prior art, the inventors have researched the reduction of residual stress at the level of the metallurgic parameters involved before quenching.

Since the possibilities for deviating from the compositions of the existing alloys are limited for the major alloying elements (Cu and Mg) because of the high mechanical properties which must be obtained, the inventors sought modifications in the contents of the minor alloying elements, and found that the best results in terms of reducing residual stress, and thus in terms of machining stability, were obtained when the contents of iron and manganese by weight were such that:

Mn<0.55% Fe<0.25% and 0<Mn–2Fe<0.2%

This indicates that the lower the iron content, the more the manganese content must be reduced. The iron content of Al—Cu alloys has a tendency to be lowered regularly, for example as evidenced by the evolution, over the last 20 years, of the compositions registered with the Aluminum Association for the alloys 2024, 2124, 2224 and 2324, whereas in these successive compositions, the Mn content has not changed. Adjusting the outlet temperature of the hot rolling obtains, with the compositions according to the invention, a largely recrystallized microstructure with a recrystallization rate which is always higher than 50% and a recrystallization gradient between the surface and the core of the sheet which is always less than 35%. This is particularly remarkable in heavy sheets which, at mid-thickness, have a structure which is substantially more recrystallized than the sheets of the prior art with the same composition in terms of major elements.

Contrary to what the metallurgist specializing in high-strength aluminum alloys might expect, this highly recrystallized structure and the low Mn contents, which participate in the age hardening of the alloy due to the fine precipitates of $Al_2OCu_2Mn_3$ and $AlMn_6$, do not affect the static mechanical properties of the sheet in any significant way. Moreover, it has been determined that the fatigue properties are also preserved, whereas a reduction in fatigue resistance might have been expected.

Furthermore, in the case of heavy sheets >20 mm thick, the inventors unexpectedly determined that a largely recrystallized structure would lead to greater toughness in all directions, as measured by the critical stress intensity factor under plane strain $K_{1c}$ in accordance with the ASTM E 399 standard.

Finally, these heavy sheets with a largely recrystallized structure have lower crack-velocities in the L-T and T-L directions than the sheets of the prior art with the same composition in terms of major elements. Thus, they make it possible to obtain an advantageous compromise between the static mechanical properties and the damage tolerance properties (toughness and crack velocity).

For light sheets, the inventors determined that the composition according to the invention had a positive influence on the elongation in the transverse-long direction of the sheet, in contrast to the generally accepted idea that high Mn and Fe contents have a favorable effect on this elongation, since the fine precipitates from the manganese make it possible to homogenize the strain by limiting the formation of bands of strain. Likewise, it was generally accepted by metallurgists that for light or average sheets, an extremely recrystallized and fine-grained structure, which was recognized to be beneficial to elongation, was preferably obtained with high Mn and Fe contents.

Thus the reduction in the Mn–2Fe content below the 0.2% threshold, in light sheets as well as heavy sheets, leads not only to a reduction in residual stress which results in better machining stability, but also to a set of usage properties which are particularly advantageous for aircraft construction. It is not desirable, however, for the value of Mn–2Fe to become negative, since in that case a degradation of the mechanical properties is observed without any additional gain in the reduction of internal stress.

The sheets according to the invention have, in the quenched and stretched state or in the quenched, stretched and annealed state, a level of residual stress such that the deflection f measured after a machining-to half-thickness of a bar resting on two distant supports with a length l is such that:

$$fe < 0.14 l^2$$

with f being measured in micrometers, and the thickness e of the sheet and the length l being expressed in mm.

This deflection is measured in the following way. Two bars are taken from the sheet with the thickness e: one called the direction L bar, which has a length b in the direction of the length of the sheet (direction L), a width of 25 mm in the direction of the width of the sheet (direction TL) and a thickness e which corresponds to the full thickness of the sheet (direction TC); the other, called the direction TL bar, has 25 mm in the direction L, b in the direction TL and e in the direction TC.

Each bar is machined to half-thickness and the deflection is measured at the mid-length of the bar. This deflection represents the level of internal stress of the sheet and its ability not to be deformed-during machining.

For heavy sheets with a thickness greater than 20 mm, the length b of the bars is 5e+20 mm. The machining is a progressive mechanical machining in 2 mm passes. The deflection at mid-length is measured to the nearest micrometer with the aid of a comparator, at the center of the bar, which is positioned between two distant knives with l=5e, which bar extends 10 mm beyond both sides of the knives.

For sheets with a thickness of <20 mm, the length b of the bar is 400 mm and the length l used to measure the deflection is set at 300 mm.

For thicknesses between 8 and 20 mm, the machining is a mechanical machining in 1 mm passes. Below 8 mm, the machining is a chemical one in a soda bath. One side of the bar is protected by means of a flexible plastic mask put in place before the test. The sample is removed from the etching bath and its thickness is checked every 15 minutes.

For light sheets with a thickness of <2 mm, the method is slightly different. The measurement of the deflection is carried out with the bar placed on its side (length, half-thickness) on a sheet of paper marked in millimeters, which is itself placed on a horizontal surface, making it possible to measure the deflection to the nearest 0.5 mm, by eliminating the influence of the dead weight of the bar and the force of the comparator on the deflection at mid-length.

The inventors also determined that the isotropy of strain could be improved. Thus, in the sheets according to the invention, the deflection measured on the bars in the long direction and in the direction transverse to the rolling were such that:

(direction L deflection)<1.5(direction TL deflection)

For light and average sheets <12 mm thick, it was determined that the roughness after chemical machining was less than 6 micrometers, and for sheets less than <4 mm thick, less than 3 micrometers.

The invention also applies to aluminum alloy products other than sheet metals, for example extruded, forged, or die-formed products. In this case, the thickness e of the bar is the local thickness of the piece, and if this thickness is not constant, a surfacing can be carried out in order to produce a bar of constant thickness for the measurement of the deflection.

These products have a yield strength >290 MPa in the quenched and de-stressed state, and >400 MPa in the quenched, de-stressed and annealed state.

BRIEF DESCRIPTION OF THE DRAWINGS

FIGS. 1 through 10 represent the comparative results mentioned in the three examples so as to show the improvements in the properties obtained by the sheets according to the invention.

DESCRIPTION OF THE PREFERRED EMBODIMENTS

EXAMPLE 1

The inventors carried out several semi-continuous castings of plated sheets made from different alloys of the 2024 type, in the nomenclature of the Aluminum Association. All of the plates had the same dimensions and were cast using the same procedures. They were subjected to a standard transformation sequence for heavy sheets, that is: reheating after homogenization, hot rolling, natural aging, quenching with cold water by spraying, controlled stretching in accordance with the EN 515 standard between 1.5 and 3%, age hardening at an ambient temperature. In this way, sheets were obtained which had a thickness of 55 mm in the T351 state, in the nomenclature of the Aluminum Association. The compositions of the cast alloys were the following:

| Alloy | Si | Fe | Cu | Mn | Mg | Cr | Zn | Ti | Zr |
|---|---|---|---|---|---|---|---|---|---|
| A1 | 0.11 | 0.23 | 4.32 | 0.63 | 1.43 | 0.022 | 0.11 | 0.02 | 0.014 |
| A2 | 0.08 | 0.17 | 4.52 | 0.52 | 1.40 | 0.008 | 0.10 | 0.02 | 0.002 |
| A3 | 0.08 | 0.16 | 4.48 | 0.51 | 1.41 | 0.007 | 0.08 | 0.02 | 0.002 |
| A4 | 0.08 | 0.15 | 4.32 | 0.37 | 1.29 | 0.005 | 0.05 | 0.02 | 0.001 |
| A5 | 0.08 | 0.16 | 4.44 | 0.54 | 1.30 | 0.008 | 0.08 | 0.02 | 0.002 |

Figure 1:
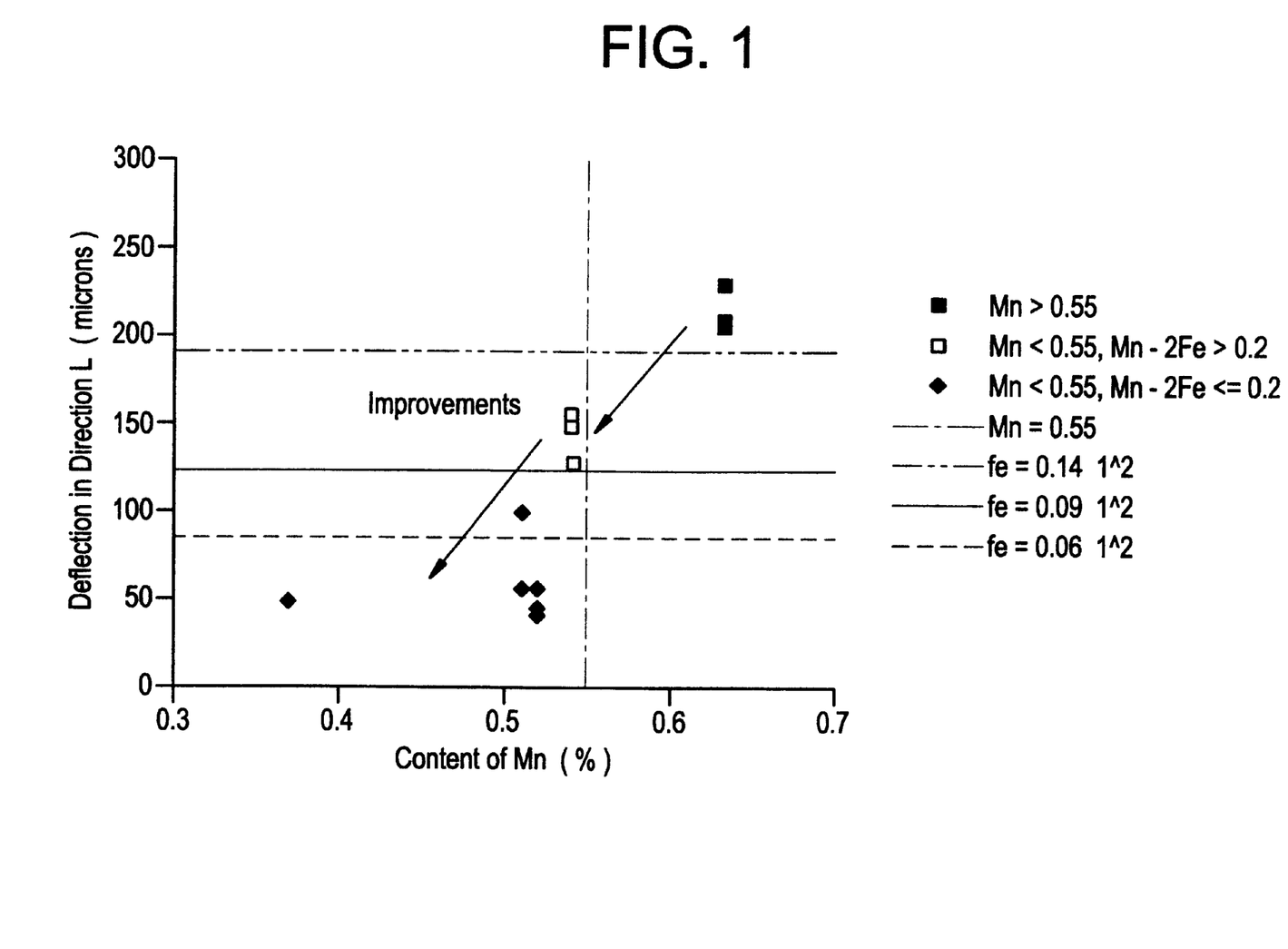
FIGS. 1 and 2 show the improvement in machining stability in the long direction (L) and in the traverse-long direction (TL) for heavy sheets.
Figure 2:
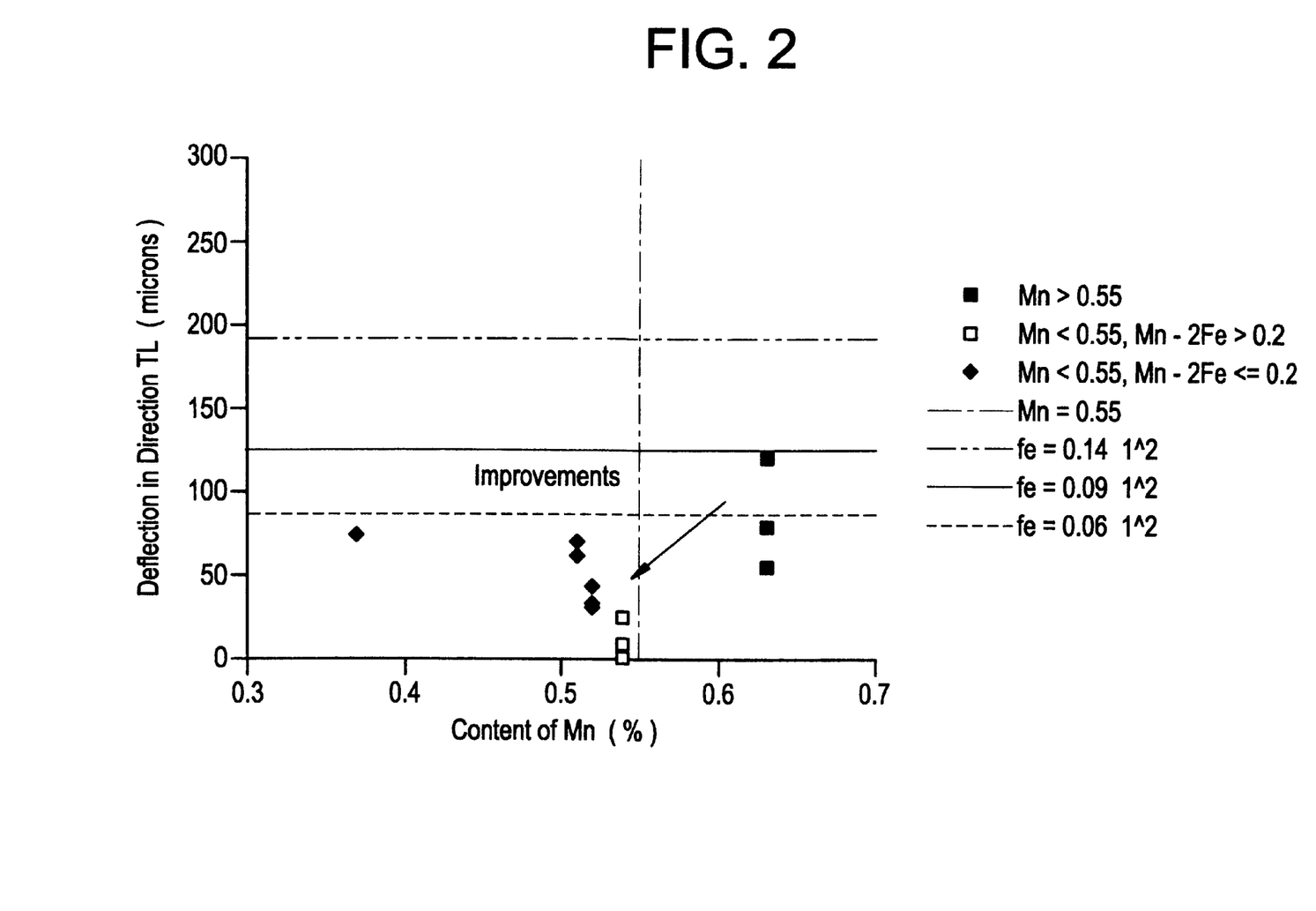
Figure 3:
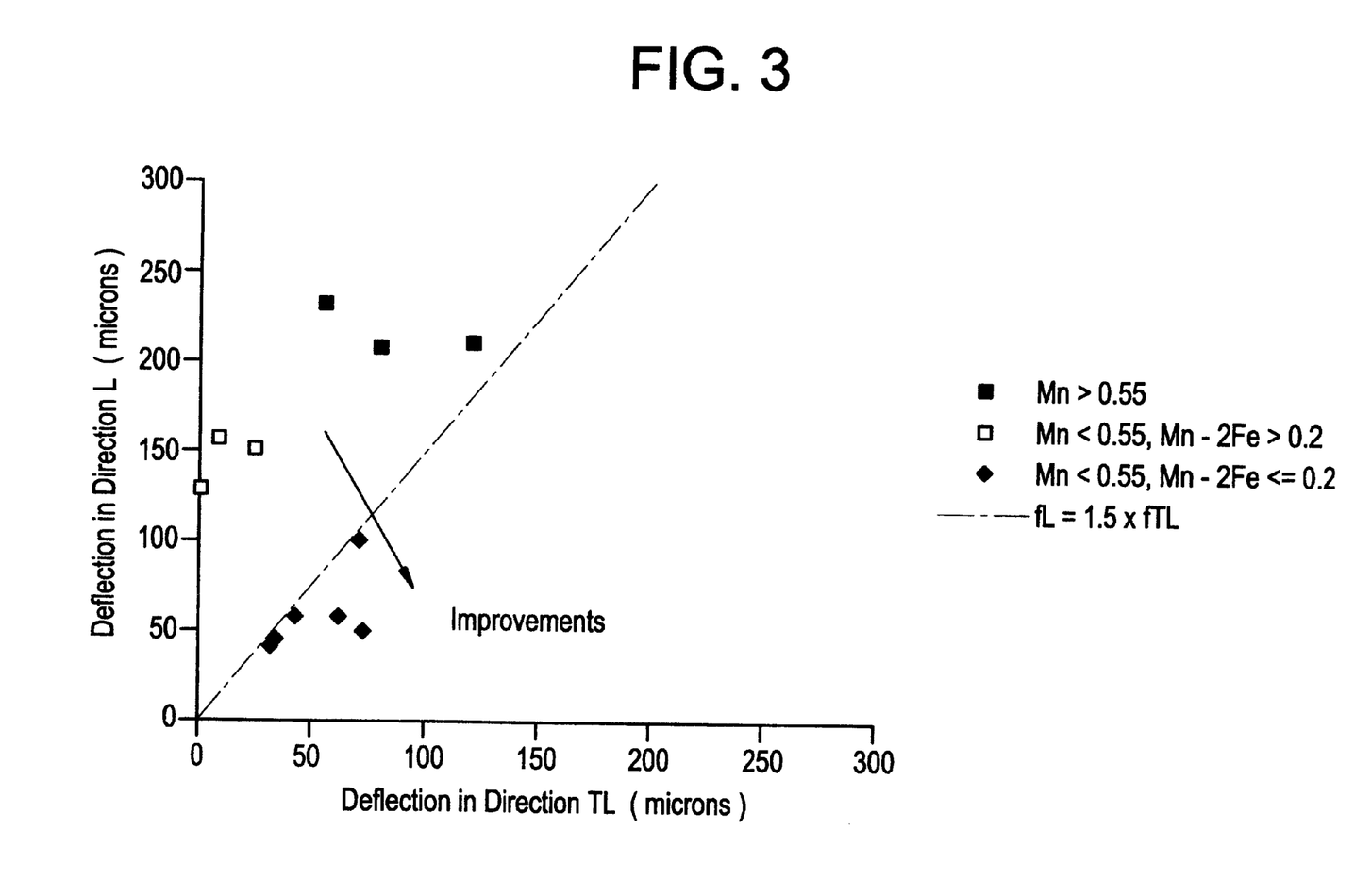
FIG. 3 shows the improvement in the isotropy of the machining stability for these sheets in the directions L and TL.
Figure 4:
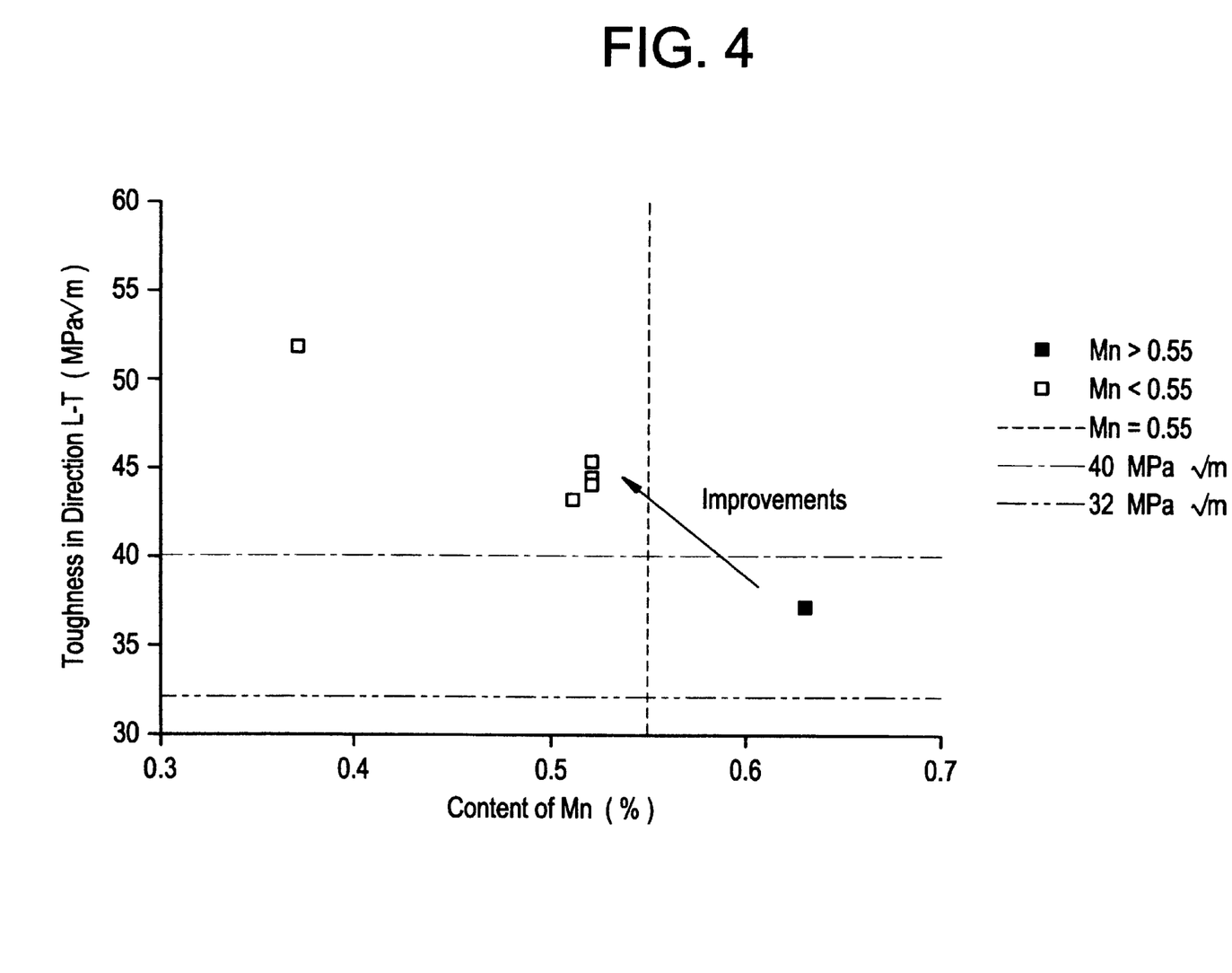
FIGS. 4, 5 and 6 show, for these same sheets, the improvement in toughness in the directions L-T, T-L, and S-L.
Figure 5:
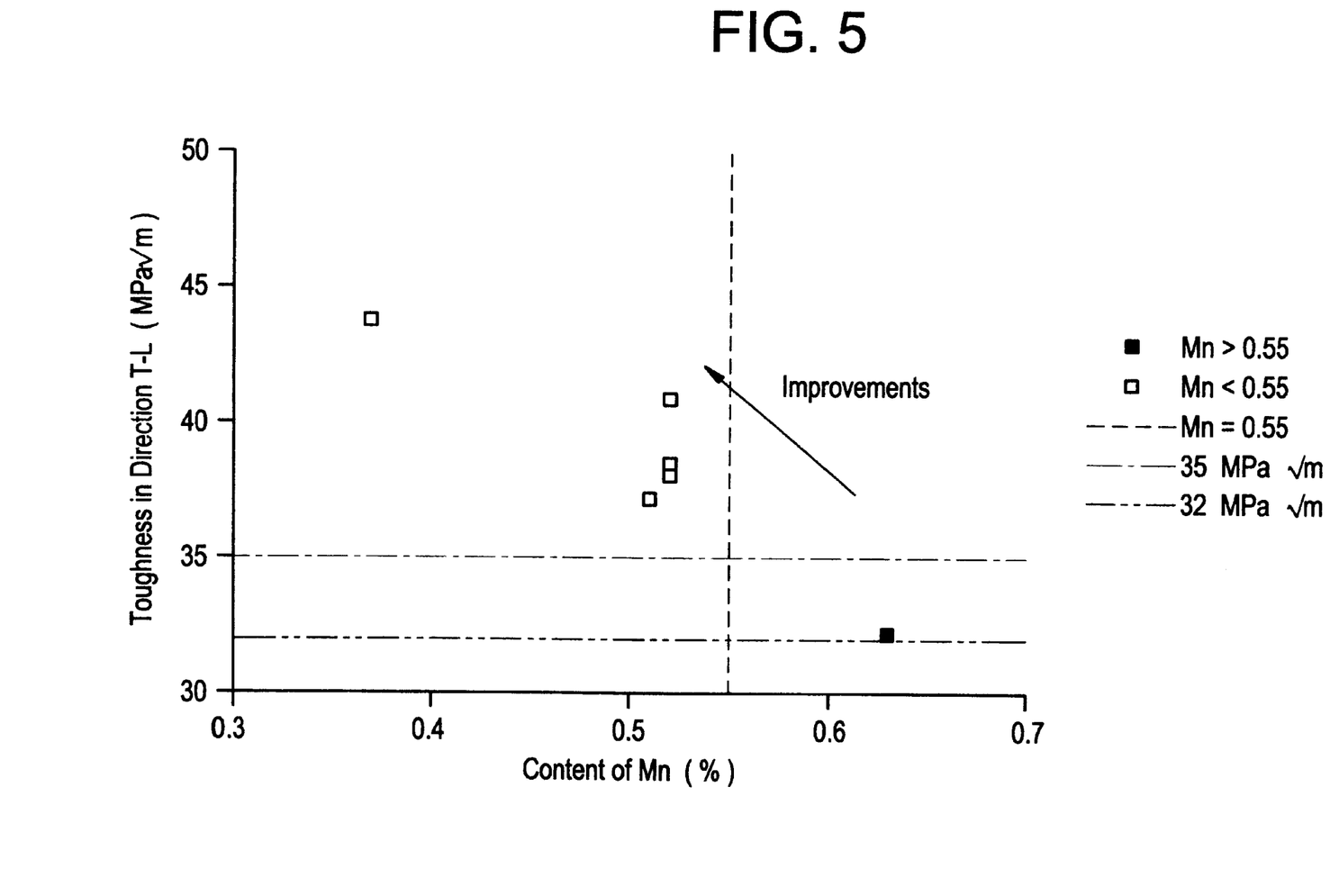
Figure 6:
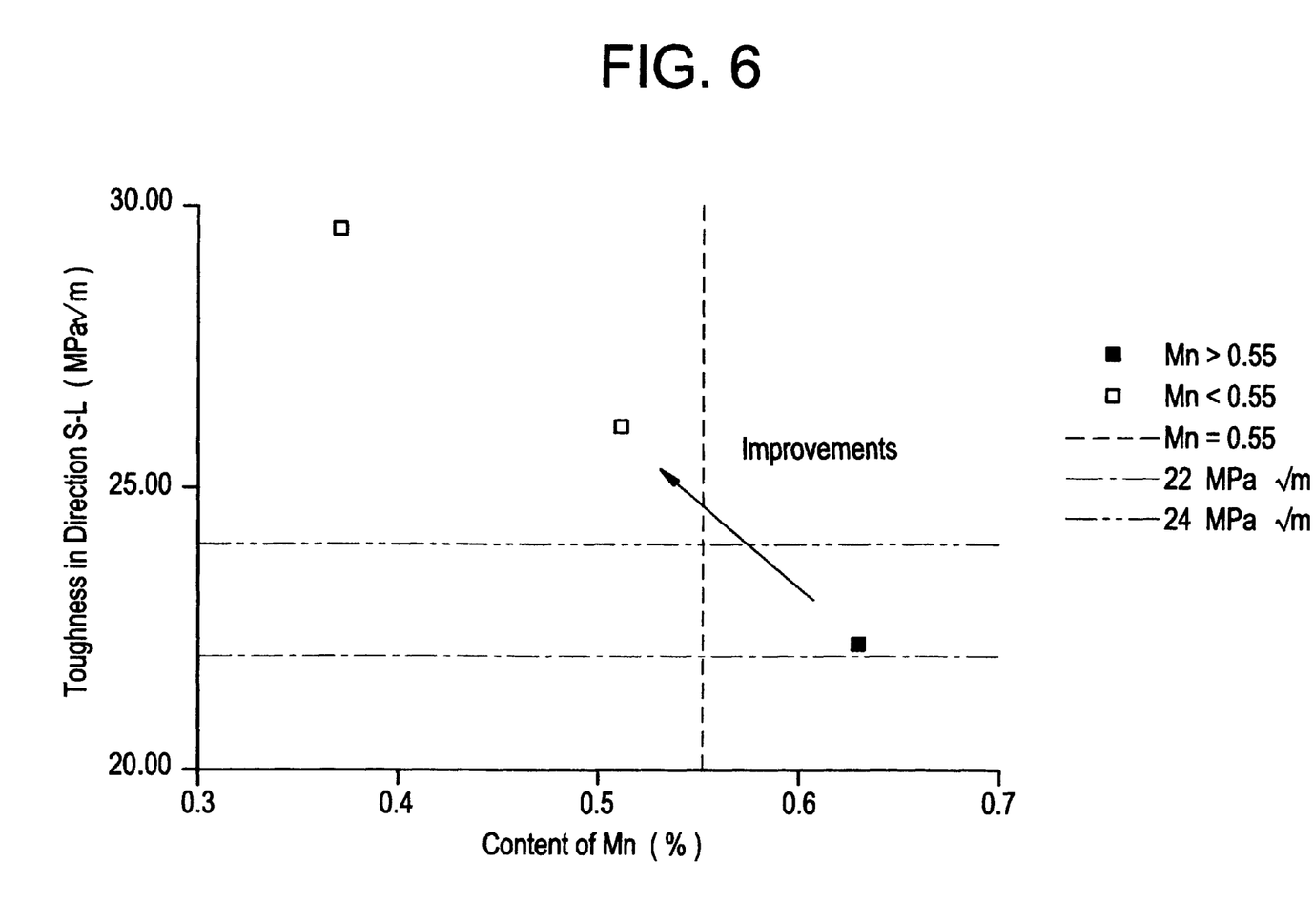
Figure 7:
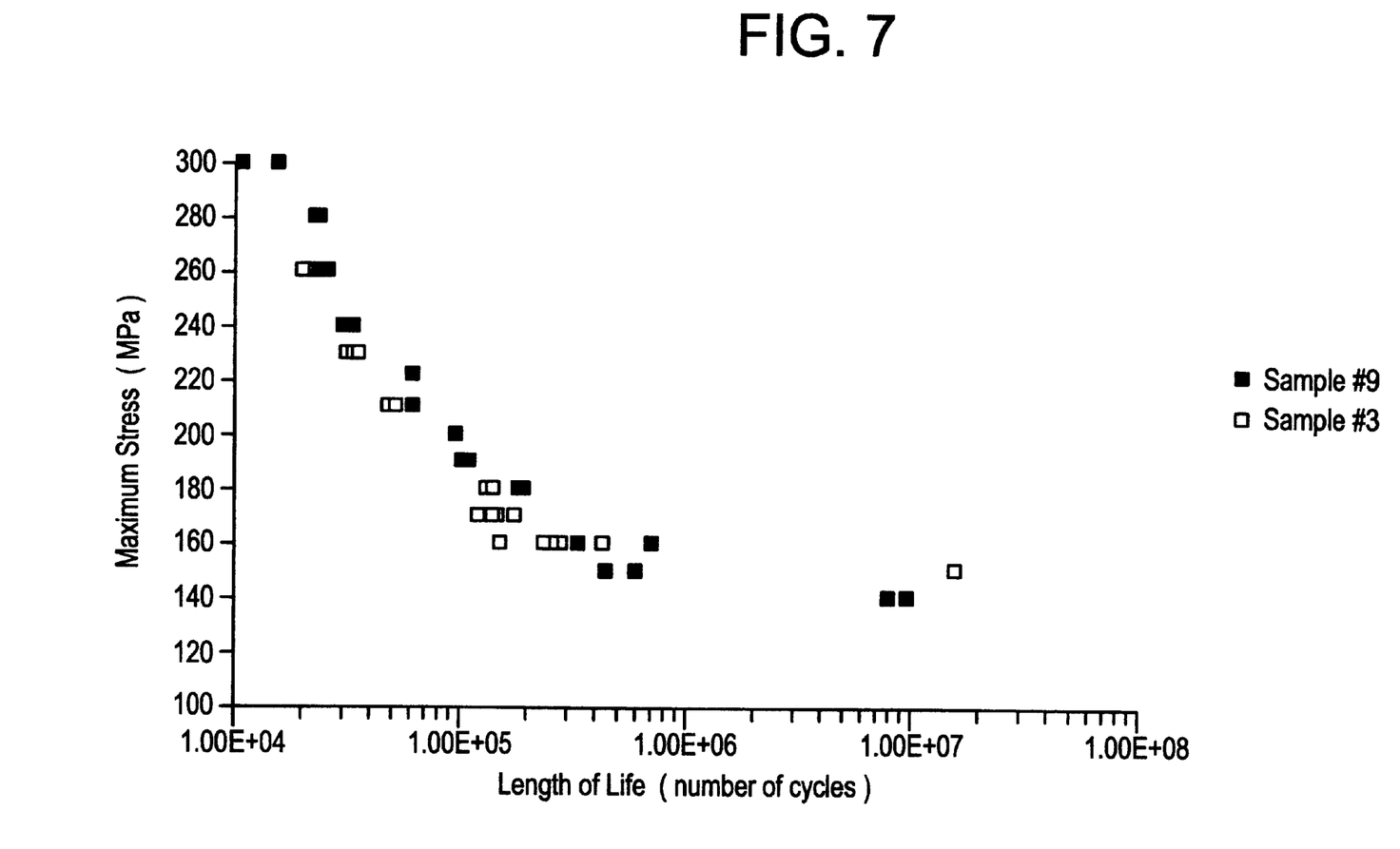
FIG. 7 illustrates the results in terms of fatigue resistance.
Figure 8:
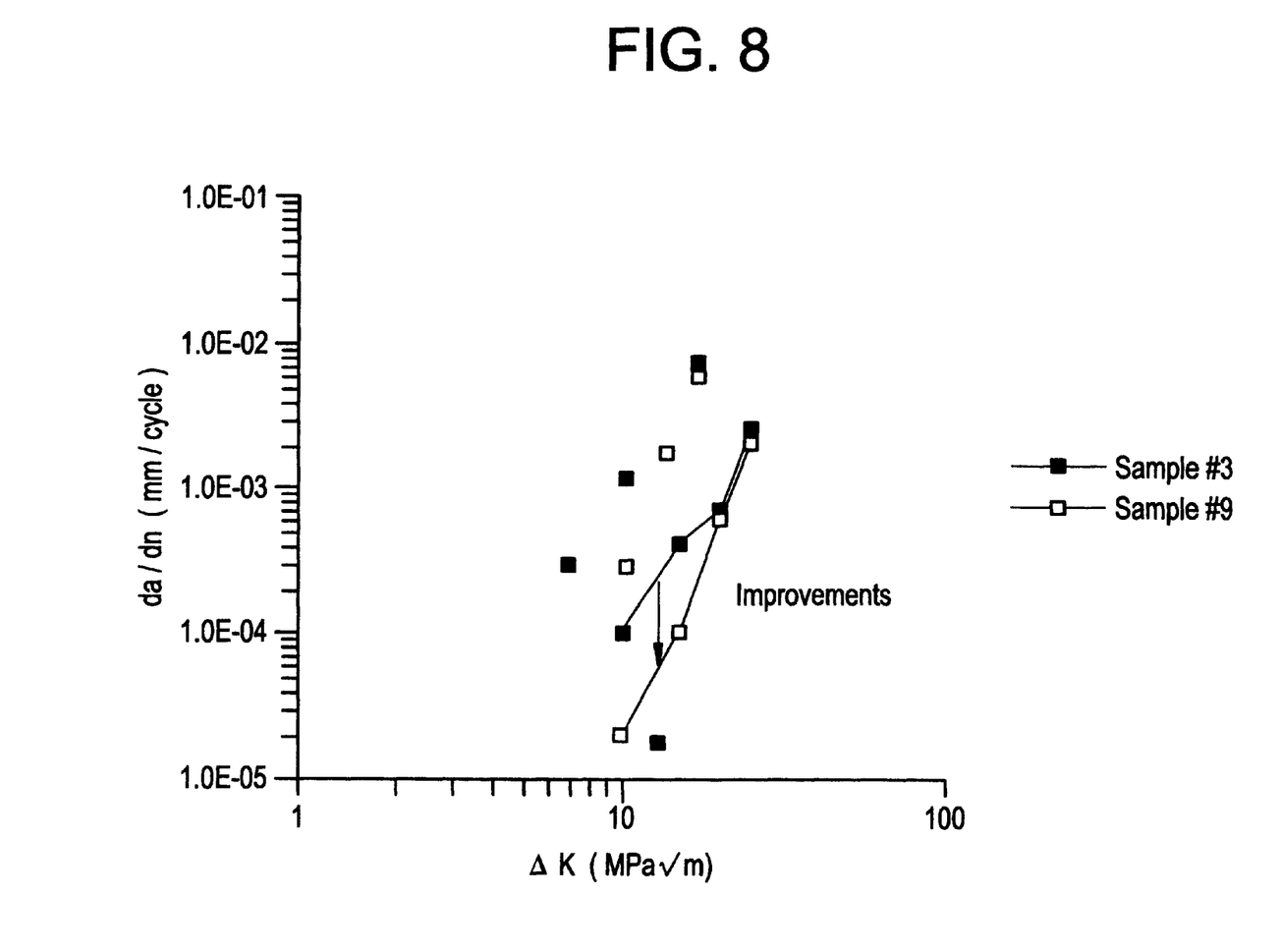
FIG. 8 shows the relative improvement in crack velocity.

The following measurements were carried out on these sheets:

- deflection after machining according to the method described above. It was noted that the deflection obtained in the sheets made from the alloys A2, A3 and A4 according to the invention is lower, particularly in the direction L, than for those made from the alloys A1 and A5 outside the invention.
- static mechanical properties (tensile strength $R_m$, 0.2% yield strength $R_{0.2}$, elongation at rupture A) in the directions TL (transverse to the rolling) and TC (transverse-short).
- toughness measured in the directions L-T, T-L and S-L in accordance with the ASTM E399 and B645 standards. The improvement appears in FIGS. 4 through 6.
- recrystallization rate at the surface, at quarter thickness and at mid-thickness, measured from micrographs. All of the above results are arranged in Table 1.
- fatigue life measured in the directions L and T-L according to the ASTM E466 standard, for sample No. 3 (the alloy A1 outside the invention) and sample No. 9 (the alloy A4 according to the invention). The test bars are 3 mm flat test bars taken from the sheets at quarter thickness. The machining of a central hole makes it possible to have a stress concentration factor $K_t$=2.3. The loading is with a ratio R of minimum stress to maximum stress of 0.1. The results, indicated in Table 2, are roughly identical in the directions L and T-L. They are shown in FIG. 7, and quite similar results are noted for the two alloys.
- crack velocity da/dn, also for samples No. 3 and 9, measured in the directions T-L and L-T in accordance with the ASTM E647 standard, with a ratio R=0.1, for values of ΔK between 10 and 25 MPa√m. The test bars are CT 35 test bars taken from the sheets at quarter thickness. The results, indicated in Table 3, are quite similar in both directions. It is noted in FIG. 8 that the crack velocities are lower in sample No. 9 than in sample No. 3.

EXAMPLE 2

Plates made from an alloy of the 2024 type were cast semi-continuously, then subjected to a standard transformation sequence for light plated sheets, namely: reheating, simultaneous hot-rolling with two plating sheets made from the alloy 1070, cooling, cold rolling, natural aging, quenching with cold water, finishing by pass rolling and controlled stretching, age hardening at an ambient temperature. In this way, sheets with a thickness of 1.6 mm in the T351 state were obtained which had, on each side, a plating thickness representing 5% of the thickness of the sheet.

The compositions of the alloy 2024 were the following:

| Alloy | Si    | Fe   | Cu   | Mn   | Mg   | Cr    | Zn   | Ti    | Zr    |
|-------|-------|------|------|------|------|-------|------|-------|-------|
| A6    | 0.09  | 0.19 | 4.38 | 0.63 | 1.50 | 0.013 | 0.10 | 0.024 | 0.014 |
| A7    | 0.079 | 0.17 | 4.36 | 0.52 | 1.30 | 0.012 | 0.013| 0.022 |       |

The following properties were measured in these sheets:

the deflection after machining according to the method described above. It is noted that in the alloy A7 according to the invention, this deflection was clearly reduced, both in the direction L and in the direction TL, relative to the alloy A6 outside the invention, and that it verifies the relation: fe<0.04 l$^{2}$·

| Alloy | Si    | Fe    | Cu   | Mn   | Mg   |
|-------|-------|-------|------|------|------|
| A8    | 0.08  | 0.17  | 4.45 | 0.53 | 1.46 |

| Alloy | Cr    | Ni    | Zn   | Ti   | Zr    |
|-------|-------|-------|------|------|-------|
| A8    | 0.007 | 0.005 | 0.06 | 0.02 | 0.002 |

The following properties were measured in these sheets:

the deflection after machining according to the procedure described above, the static mechanical properties in the direction TL (transverse to the rolling), the recrystallization rate on the surface, at quarter thickness and at mid-thickness.

Figure 11:
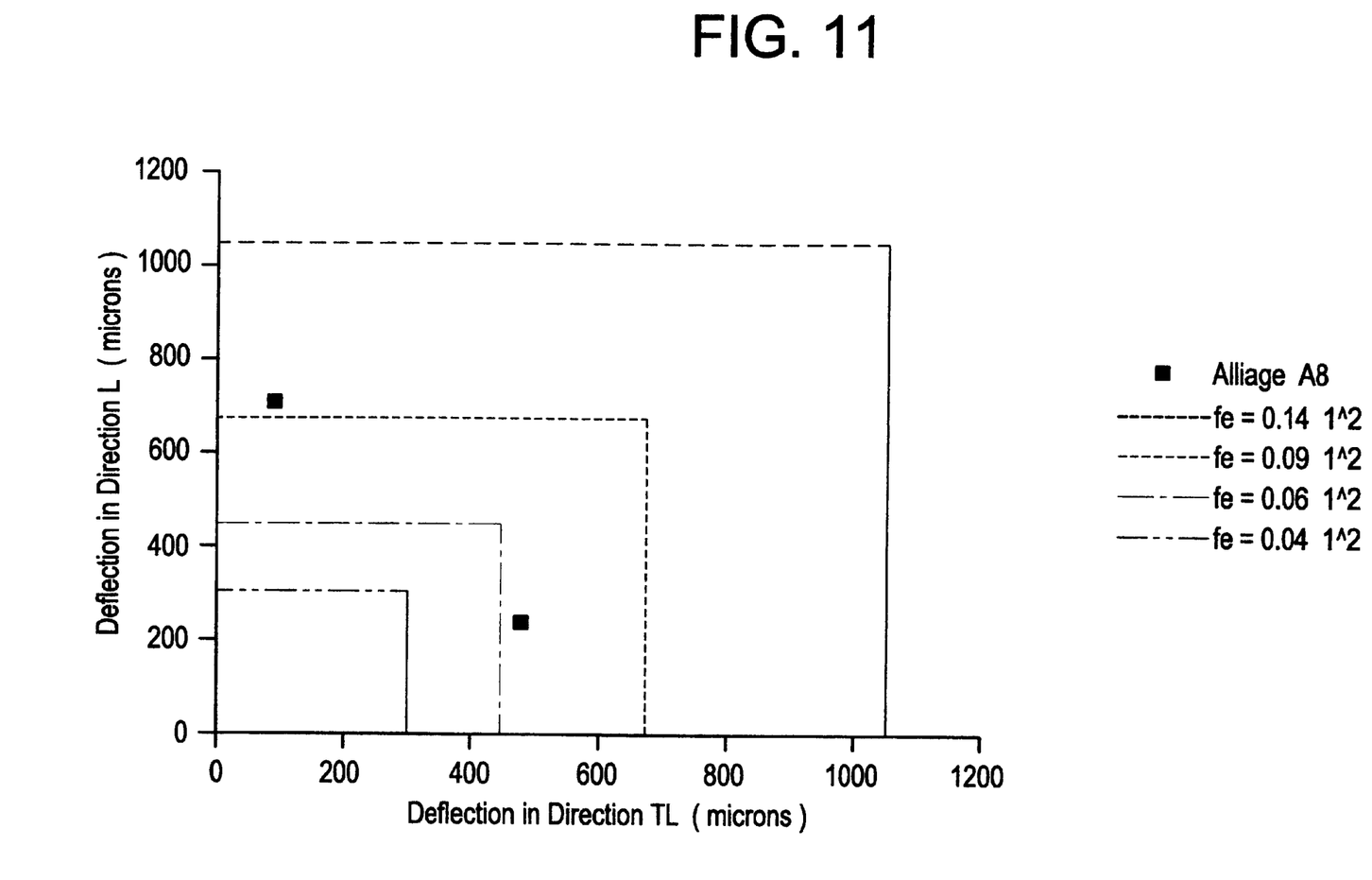
FIGS. 11 and 12 illustrate the results related to machining stability and crack velocity for average sheets.
Figure 12:
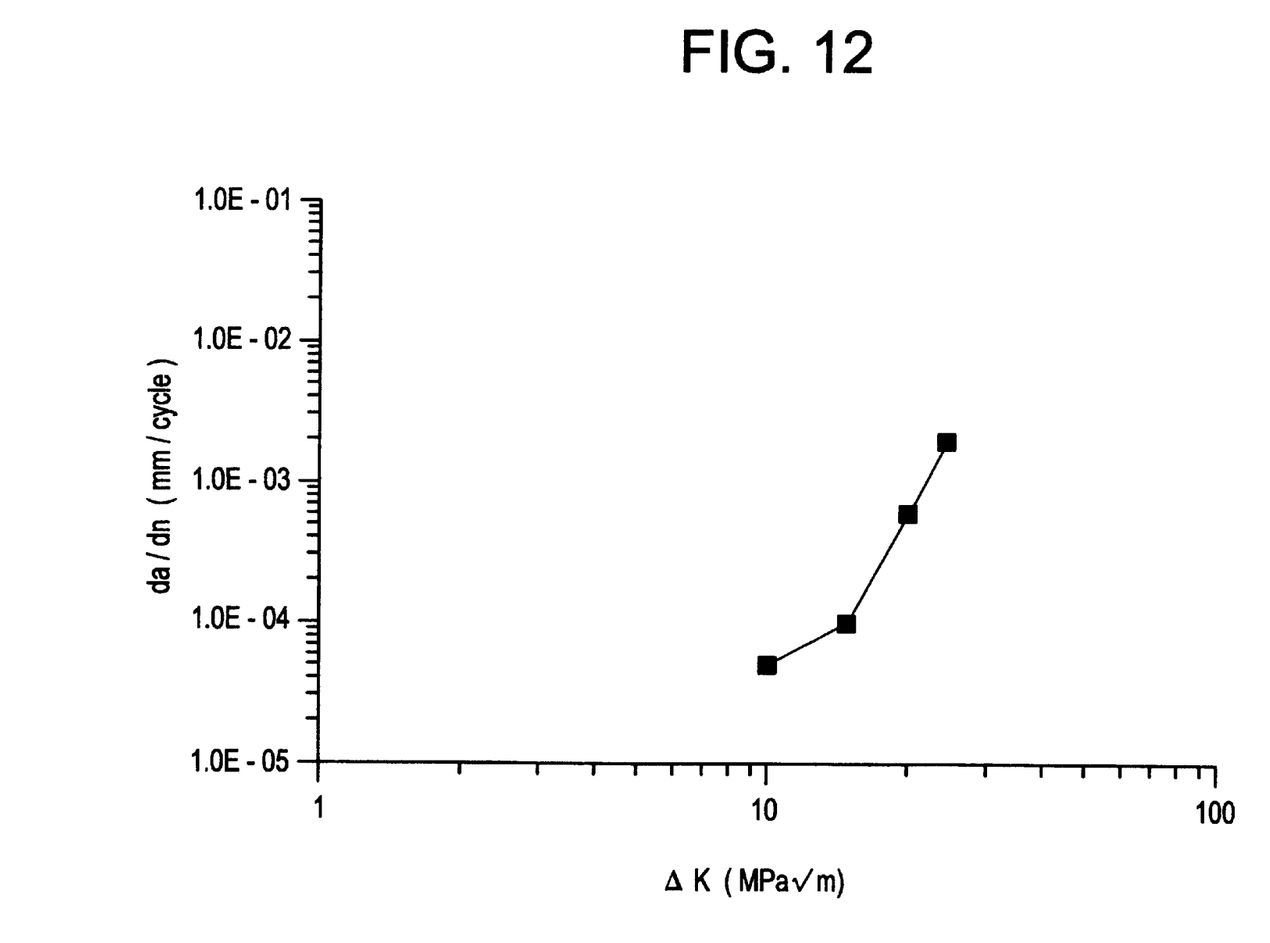

The results are presented in Table 5 and illustrated in FIGS. 11 and 12.

TABLE 1

| SHEET | | | DEFLECTION | | RECRYSTALLIZATION | | | | MECHANICAL PROPERTIES | | | | | | TOUGHNESS | | |
|---|---|---|---|---|---|---|---|---|---|---|---|---|---|---|---|---|---|
| | e. | | (micrometers) | | | | | Surface/Mid-th. | TL | | | TC | | | | | |
| No. | (mm) | Alloy | fL | fTL | Surface | Quarter | Mid-th. | Deviation | Rm | R0.2 | A % | Rm | R0.2 | A % | L–T | T–L | S–L |
| 1 | 55 | A1 | 210 | 120 | | | | | 478 | 351 | 13.6 | 431 | 306 | 5.9 | | | |
| 2 | 55 | " | 231 | 55 | | | | | 468 | 342 | 15.7 | 432 | 306 | 6.1 | | | |
| 3 | 55 | " | 207 | 79 | 79 | 58 | 30 | 49 | 470 | 341 | 15.3 | 432 | 306 | 6.2 | 37.1 | 32.2 | 22.2 |
| 4 | 55 | A2 | 57 | 43 | 99 | 95 | 71 | 28 | 461 | 330 | 16.5 | 419 | 315 | 7 | 44.4 | 38.1 | |
| 5 | 55 | " | 46 | 33 | 100 | 95 | 69 | 31 | 462 | 329 | 17.2 | 417 | 314 | 6.3 | 44 | 40.9 | |
| 6 | 55 | " | 42 | 31 | 100 | 96 | 68 | 32 | 462 | 329 | 16.9 | 422 | 312 | 7.1 | 45.3 | 38.5 | |
| 7 | 55 | A3 | 57 | 62 | 97 | 84 | 63 | 34 | 468 | 343 | 17.7 | 421 | 320 | 5.4 | | | |
| 8 | 55 | " | 100 | 70 | 96 | 68 | 62 | 34 | 481 | 358 | 14.7 | 422 | 315 | 4.9 | 43.2 | 37.2 | 26.1 |
| 9 | 55 | A4 | 49 | 73 | 99 | 93 | 70 | 29 | 463 | 332 | 14.4 | 425 | 299 | 8.5 | 51.8 | 43.8 | 29.6 |
| 10 | 55 | A5 | 156 | 9 | 95 | 82 | 64 | 31 | 470 | 344 | 16.5 | 425 | 312 | 6.1 | | | |
| 11 | 55 | " | 128 | 1 | 96 | 86 | 62 | 34 | 468 | 336 | 17.4 | 418 | 314 | 5.1 | | | |
| 12 | 55 | " | 150 | 25 | 99 | 88 | 70 | 29 | 469 | 338 | 16.1 | 418 | 314 | 6 | | | |

Rm, R0.2 in MPa
Toughness in MPa $\sqrt{m}$ the static mechanical properties in the direction TL (an average of 2 test bars taken in the direction transverse to the rolling and an average of 4 sheets per alloy).

Figure 9:
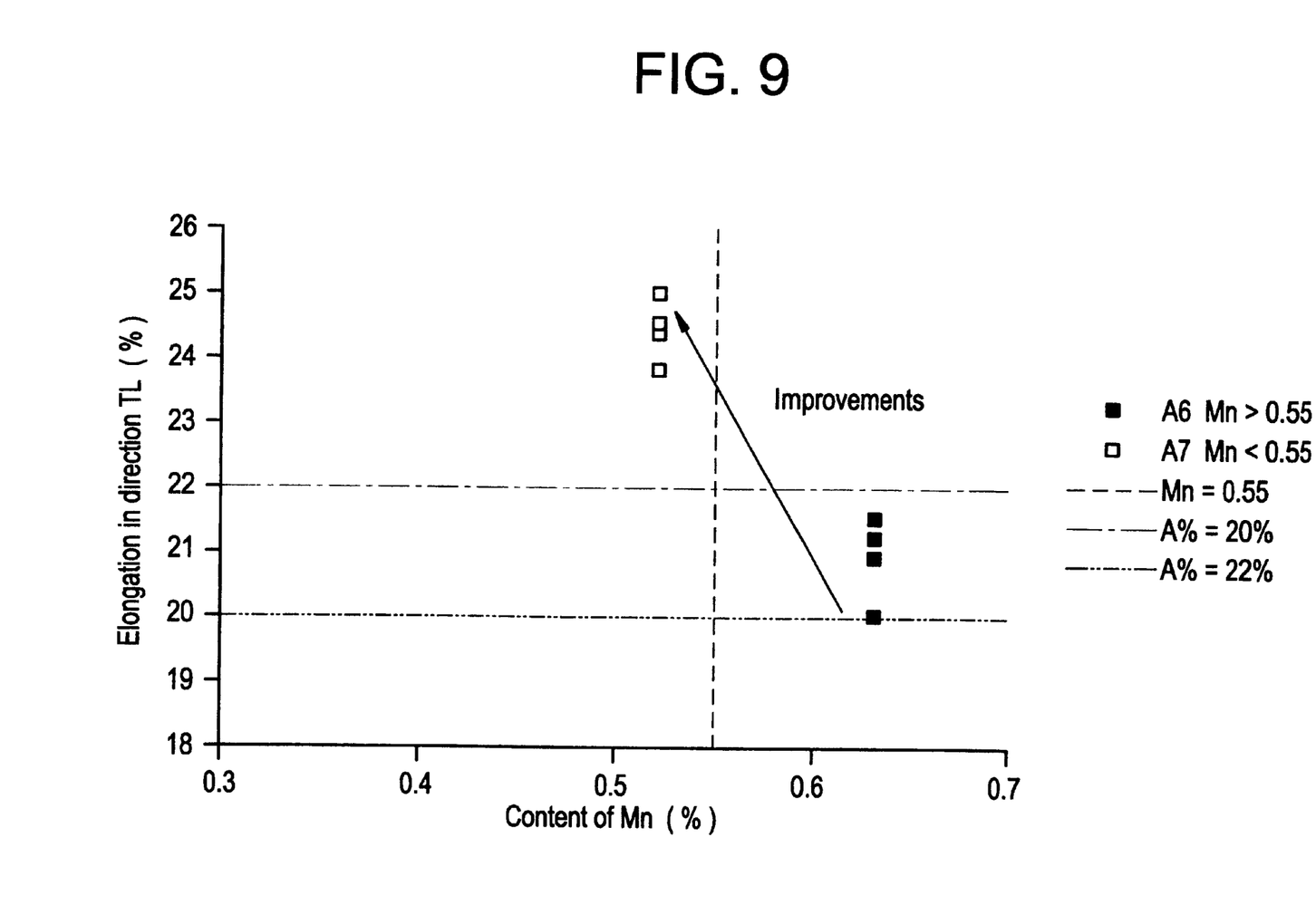
FIG. 9 shows the improvement in elongation in the direction T-L in light sheets.
Figure 10:
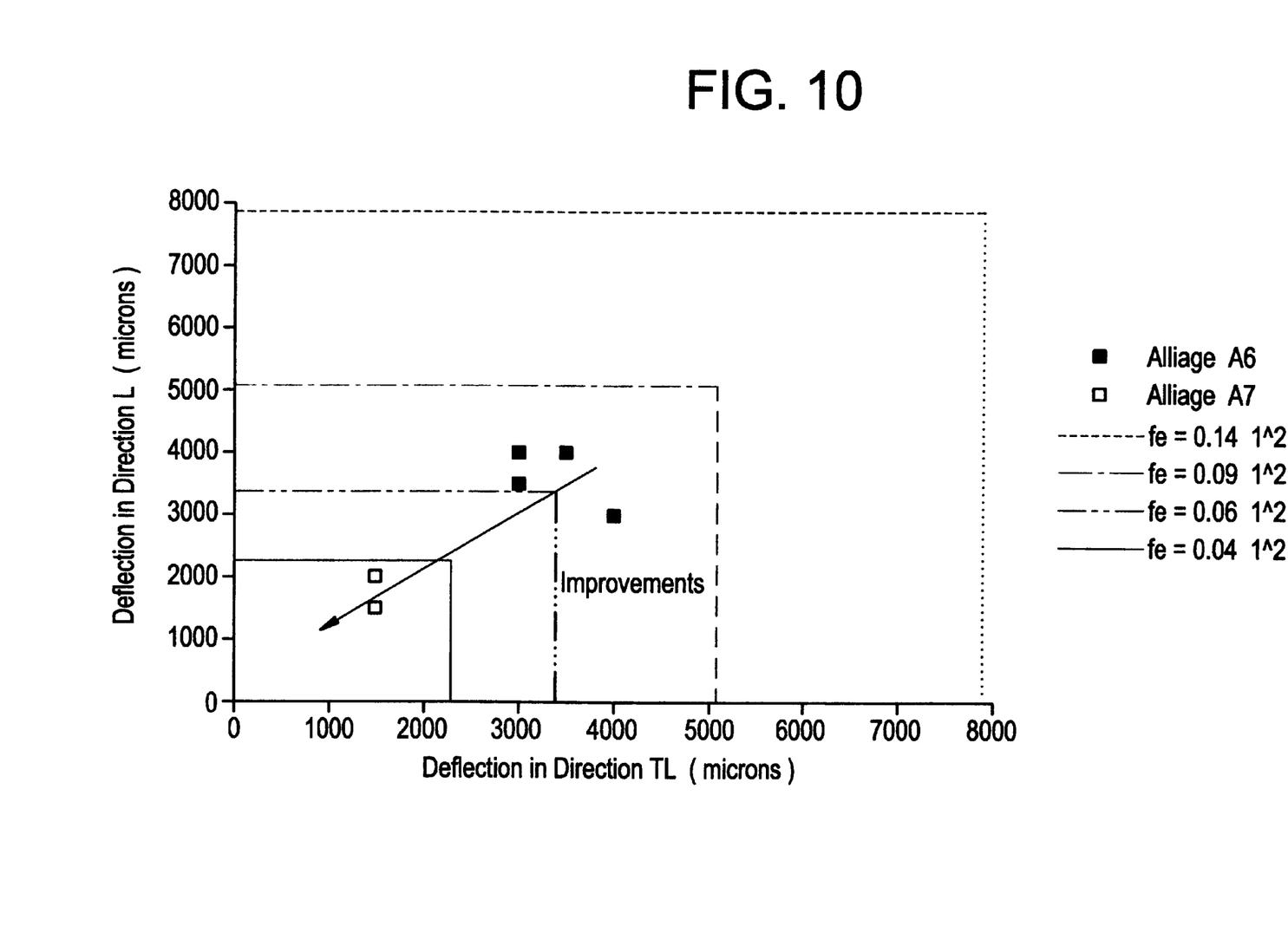
FIG. 10 shows the improvement in machining stability for light sheets.

The results are summarized in Table 4. An improvement in the elongation in the direction TL of the alloy A7 relative to A6 is noted in FIG. 9, and a reduction in the deflection during machining of A7 relative to A6 is noted in FIG. 10.

EXAMPLE 3

Plates with the same dimensions were cast semi-continuously, using the same casting procedure. These plates were subjected to a standard transformation sequence for average sheets, that is: reheating, hot rolling, natural aging, quenching with cold water, controlled stretching, age hardening at an ambient temperature. In this way, sheets with a thickness of 12 mm in the T351 state were obtained, which had the following composition:

TABLE 2

Fatigue results in sheet Nos. 3 and 9
(Kt = 2.3, R = 0.1)

| Sheet No. 3 Direction | Max. stress (MPa) | Endurance (No. of cycles) | Sheet No. 9 Direction | Max. stress (MPa) | Endurance (No. of cycles) |
|---|---|---|---|---|---|
| TL | 260 | 21000 | TL | 300 | 10700 |
| L  | 260 | 20000 | L  | 300 | 15400 |
| TL | 230 | 31000 | TL | 280 | 23200 |
| L  | 230 | 33000 | L  | 280 | 22500 |
| TL | 230 | 33000 | TL | 260 | 25600 |
| L  | 230 | 35000 | L  | 260 | 22600 |
| TL | 230 | 35000 | TL | 240 | 30200 |
| TL | 210 | 47000 | L  | 240 | 33000 |
| L  | 210 | 51000 | TL | 222 | 58800 |
| TL | 180 | 131000 | L | 210 | 60800 |

TABLE 2-continued

Fatigue results in sheet Nos. 3 and 9
(Kt = 2.3, R = 0.1)

| Sheet No. 3 Direction | Max. stress (MPa) | Endurance (No. of cycles) | Sheet No. 9 Direction | Max. stress (MPa) | Endurance (No. of cycles) |
|---|---|---|---|---|---|
| L | 180 | 140000 | TL | 200 | 95100 |
| TL | 160 | 279000 | TL | 190 | 101600 |
| L | 160 | 150000 | L | 190 | 110000 |
| TL | 150 | 15553000 | TL | 180 | 182800 |
| TL | 170 | 147000 | L | 180 | 190000 |
| L | 170 | 173000 | TL | 160 | 332000 |
| TL | 160 | 420000 | L. | 160 | 700000 |
| L | 160 | 256000 | TL | 150 | 589700 |
| TL | 170 | 121000 | L | 150 | 434000 |
| L | 170 | 139000 | TL | 140 | 9567000 |
| TL | 160 | 234000 | L | 140 | 7834500 |

TABLE 3

| Sheet No. 3 Delta $\underline{K}$ (MPa$\sqrt{m}$) | da/dn (mm/cycle) | Sheet No. 9 Delta $\underline{K}$ (MPa$\sqrt{m}$) | da/dn (mm/cycle) |
|---|---|---|---|
| 10 | 1.0E−04 | 10 | 2.0E−05 |
| 15 | 4.0E−04 | 15 | 1.0E−04 |
| 20 | 7.0E−04 | 20 | 6.0E−04 |
| 25 | 2.5E−03 | 25 | 2.0E−03 |

TABLE 4

| SHEET | | | DEFLECTION (micrometers) | | MECHANICAL PROPERTIES TL | | |
|---|---|---|---|---|---|---|---|
| Sheet No. | Alloy | ei (mm) | fL | fTL | Rm (MPa) | R0.2 (MPa) | A % |
| 13 | A6 | 1.6 | 4000 | 3000 | 440 | 305 | 20.05 |
| 14 | A6 | 1.6 | 3000 | 4000 | 440.5 | 301.5 | 20.95 |
| 15 | A6 | 1.6 | 4000 | 3500 | 441 | 298.5 | 21.55 |
| 16 | A6 | 1.6 | 3500 | 3000 | 443 | 301 | 21.25 |
| | | Average | 3625 | 3375 | 441.1 | 301.5 | 21.0 |
| 17 | A7 | 1.6 | 500 | 0 | 439.5 | 294 | 24.55 |
| 18 | A7 | 1.6 | 1500 | 1500 | 438.5 | 277.5 | 24.4 |
| 19 | A7 | 1.6 | 2000 | 1500 | 440 | 290 | 23.85 |
| 20 | A7 | 1.6 | 1000 | 0 | 441 | 289.5 | 25 |
| | | Average | 1250 | 750 | 439.8 | 287.8 | 24.5 |

TABLE 5

| SHEET | | | DEFLECTION (micrometers) | | RECRYSTALLIZATION | | | | MECHANICAL PROPERTIES: TL | | |
|---|---|---|---|---|---|---|---|---|---|---|---|
| Sheet No. | e. (mm) | Alloy | fL | fTL | Surface | Quarter | Core | Surface-Core Deviation | Rm (MPa) | R0.2 (MPa) | A % |
| 21 | 12 | A8 | 240 | 480 | 90 | 90 | 67 | 23 | 465 | 335 | 15 |
| 22 | 12 | A8 | 710 | 90 | 100 | 99 | 97 | 3 | 470 | 339 | 15 |

What is claimed is:

1. A metal sheet with a total thickness >0.5 mm, comprising an AlCuMg aluminum alloy consisting essentially of Al and, in % by weight:

3.5 < Cu < 5.0
1.0 < Mg < 2.0
Si < 0.25
Fe < 0.25
Mn < 0.55 all other elements: <0.25
with 0<Mn−2Fe<0.2,
optionally plated with another aluminum alloy with the thickness of the plating being no more than 12% of the total thickness of the sheet, said sheet having a recrystallization rate >50% at all points and a deviation in recrystallization rate between surface and mid-thickness <35%, said sheet having in the quenched and stretched state or the quenched, stretched and annealed state, a deflection after a machining to mid-thickness of a bar resting on two distant supports with a length l such that:

$$fe<0.14l^2,$$

with f being the deflection expressed in micrometers, e being the thickness of the sheet in mm and l being the length of the bar in mm.

2. The sheet according to claim 1, wherein $$fe<0.09l^2.$$

3. The sheet according to claim 2, wherein $$fe<0.06l^2.$$

4. A sheet according to claim 3 with a total thickness between 0.5 and 3 mm and $$fe<0.04l^2$$

which is plated and has in the quenched, stretched and annealed state a yield strength >380 MPa.

5. A sheet according to claim 1 in which Fe<0.20.
6. A sheet according to claim 1 in which Si<0.17.
7. The sheet according to claim 6 in which Si<0.10.
8. A sheet according to claim 1 in which Cu<4.0.
9. A sheet according to claim 1 in which Mg<1.5.
10. A sheet according to claim 1, wherein Mn<0.4.
11. A sheet according to claim 1 having, between the bars machined to half-thickness in the directions L and TL, an isotropy of deflection after machining such that (bar deflection L)<1.5×(bar deflection TL).
12. A sheet according to claim 1, wherein it has in the quenched and stretched state a yield strength in the direction TL>290 MPa.

13. A sheet according to claim 1 having in the quenched, stretched and annealed state a yield strength in the direction TL>400 MPa.

14. A plated sheet according to claim 1 having in the quenched and stretched state a yield strength in the direction TL>270 MPa.

15. A sheet according to claim 1 which is plated and has in the quenched, stretched and annealed state a yield strength >380 MPa.

16. A sheet according to claim 1 having a fatigue resistance such that the maximum stress acceptable at a given number of cycles is respectively greater than:

MPa for $10^4$ cycles

MPa for $10^5$ cycles

MPA for $10^6$ cycles

MPa for $10^7$ cycles.

17. A sheet according to claim 1 of total thickness >20 mm and having in the quenched, stretched state a toughness $K_{1c}$ in the direction L-T >35 MPa√m.

18. A sheet according to claim 1 of total thickness >20 mm having in the quenched, stretched state a toughness $K_{1c}$ in the direction T-L >32 MPa√m.

19. The sheet according to claim 17 having in the quenched, stretched state a toughness $K_{1c}$ in the direction L-T >40 MPa√m.

20. The sheet according to claim 18 having in the quenched, stretched state a toughness $K_{1c}$ in the direction T-L >35 MPa√m.

21. A sheet according to claim 1 of total thickness >35 mm and having a toughness $K_{1c}$ in the direction S-L >22 MPa√m.

22. The sheet according to claim 21 having a toughness in S-L >24 MPa√m.

23. A sheet according to claim 1 of total thickness >20 mm and having in the quenched, stretched and annealed state a toughness $K_{1c}$ in the direction L-T greater than 28 MPa√m.

24. A sheet according to claim 1 of total thickness >20 mm and having in the quenched, stretched and annealed state a toughness $K_{1c}$ in the direction T-L >25 MPa√m.

25. The sheet according to claim 23 having a toughness $K_{1c}$ in the direction L-T >32 MPa√m.

26. The sheet according to claim 24 having a toughness $K_{1c}$ in the direction T-L >28 MPa√m.

27. A sheet according to claim 23 of total thickness >35 mm and having in the quenched, stretched and annealed state a toughness $K_{1c}$ in the direction S-L >18 MPa√m.

28. The sheet according to claim 27 having in the quenched, stretched and annealed state a toughness in the direction S-L >20 MPa√m.

29. A sheet with a thickness >20 mm according to claim 1 having a crack velocity da/dn less than:

$5 \times 10^{-5}$ mm/cycle for $\Delta K = 10$ $MPa\sqrt{m}$ $10^{-4}$ mm/cycle for $\Delta K = 15$ $MPa\sqrt{m}$ $6 \times 10^{-4}$ mm/cycle for $\Delta K = 20$ $MPa\sqrt{m}$ $2 \times 10^{-3}$ mm/cycle for $\Delta K = 25$ $MPa\sqrt{m}$ 30. A sheet according to claim 1 of total thickness <20 mm and having a toughness $K_{cb}$ in the direction. T-L >110 MPa√m.

31. A sheet according to claim 1 with a thickness <12 mm and having a roughness after chemical machining <6 micrometers.

32. A sheet with a thickness <4 mm according to claim 31 having a roughness after chemical machining <3 micrometers.

33. An extruded, forged, or die-formed product comprising an AlCuMg alloy consisting essentially of Al and, in % by weight:

| |
|---|
| 3.5 < Cu < 5.0 |
| 1.0 < Mg < 2.0 |
| Si < 0.25 |
| Fe < 0.25 |
| Mn < 0.55 | all other elements <0.25 with: 0<Mn−2Fe<0.2 having a recrystallization rate >50% at all points and a deviation in recrystallization rate between surface and mid-thickness <35%, and having in the quenched state or the quenched and annealed state a deflection f after a machining to half-thickness of a bar resting on two distant supports with a length l, such that:

$$fe < 0.14 l^2$$

with f being measured in micrometers, e being the average local thickness of the product at the measurement point and l also being measured in mm.

34. The product according to claim 33 having in a quenched, de-stressed state a yield strength $R_{0.2}$>290 MPa.

35. The product according to claim 33 having in a quenched, de-stressed and annealed state a yield strength >400 MPa.

36. The product according to claim 33, wherein fe<0.09l².

* * * * *